United States Patent
Avadhanam (10) Patent No.: US 8,583,103 B2
(45) Date of Patent: Nov. 12, 2013

(54) APPARATUS AND METHOD FOR AUTOMATIC MOBILE DEVICE CRASH NOTIFICATION

(75) Inventor: Phani Bhushan Avadhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 651 days.

(21) Appl. No.: 12/400,349

(22) Filed: Mar. 9, 2009

(65) Prior Publication Data
US 2010/0227608 A1 Sep. 9, 2010

(51) Int. Cl.
*H04W 24/00* (2009.01)
*H04L 12/26* (2006.01)

(52) U.S. Cl.
USPC .......................................... 455/423; 370/242

(58) Field of Classification Search
USPC ............. 455/412.2, 418–421, 423–425, 67.7, 455/67.11–67.16, 226.1, 226.4, 12.2; 370/241–253; 375/224–228; 379/1.01–35; 714/2, 16, 25, 38.1, 47.1, 714/48–57, 699, 712, 717, 746, 750, 757, 714/758, 761–764, 786–788
See application file for complete search history.

(56) References Cited

U.S. PATENT DOCUMENTS

| | | | |
|---|---|---|---|
| 4,769,839 A * | 9/1988 | Preineder et al. | 370/458 |
| 6,212,176 B1 * | 4/2001 | Andersson et al. | 370/347 |
| 6,298,233 B1 | 10/2001 | Souissi et al. | |
| 6,775,543 B2 * | 8/2004 | Itazu et al. | 455/423 |
| 7,152,180 B2 * | 12/2006 | Shoaib et al. | 714/4.4 |
| 8,315,623 B1 * | 11/2012 | Flynn et al. | 455/423 |
| 2003/0066009 A1 * | 4/2003 | Obuchi et al. | 714/752 |
| 2006/0025122 A1 | 2/2006 | Harris et al. | |
| 2006/0277442 A1 * | 12/2006 | Lantz et al. | 714/38 |
| 2007/0066340 A1 * | 3/2007 | Yoon et al. | 455/522 |
| 2007/0255847 A1 * | 11/2007 | Smith | 709/231 |
| 2009/0215462 A1 * | 8/2009 | Lundh et al. | 455/445 |

FOREIGN PATENT DOCUMENTS

GB 2390208 12/2003
WO WO2005034550 A1 4/2005

OTHER PUBLICATIONS

International Search Report and Written Opinion—PCT/US2010/026720, International Searching Authority—European Patent Office—Jun. 7, 2010.

* cited by examiner

*Primary Examiner* — San Htun
(74) *Attorney, Agent, or Firm* — Darren M. Simon (57) ABSTRACT

An apparatus and method for automatic mobile device crash notification to a wireless network comprising setting configuration parameters for automatic notification if a crash occurs, detecting at least one stalled condition to determine if the crash occurred, gathering crash data, establishing a reverse link data call to the wireless network, and transferring the crash data to the wireless network.

23 Claims, 5 Drawing Sheets

APPARATUS AND METHOD FOR AUTOMATIC MOBILE DEVICE CRASH NOTIFICATION

FIELD

This disclosure relates generally to apparatus and methods for wireless communication systems. More particularly, the disclosure relates to automatic mobile device crash notification for wireless communication systems.

BACKGROUND

Wireless communication systems provide a variety of communication services to mobile users that are away from the fixed telecommunications infrastructure or are moving. These wireless systems employ radio transmissions to interconnect mobile devices with various base stations in the service area. The base stations, in turn, are connected to mobile switching centers which route connections to and from the mobile devices to others on various communication networks such as the public switched telephony network (PSTN), Internet, etc. In this manner, users that are away from their fixed sites or are on the move may receive various communication services such as voice telephony, paging, messaging, email, data transfers, video, Web browsing, etc.

Due to the use of radio frequencies for wireless interconnection, all mobile users must agree on a common set of protocols to share the scarce radio spectrum allocated for wireless communication services. One important protocol relates to the access method used to connect multiple mobile devices to the wireless communication network. Various access methods include frequency division multiple access (FDMA), time division multiple access (TDMA), code division multiple access (CDMA), and orthogonal frequency division multiplex (OFDM). OFDM is increasingly popular in terrestrial wireless communication systems because its format facilitates the mitigation of multipath distortions. OFDM utilizes a plurality of carriers spaced apart in the frequency domain such that data modulated on each carrier is orthogonal to the others. OFDM may be conveniently modulated and demodulated by using very efficient Fast Fourier Transform (FFT) techniques in both the transmitter and receiver. For example, the wireless multicasting standard MediaFLO (Forward Link Only) employs OFDM to broadcast data to mobile devices. If the mobile device crashes it would be advantageous to obtain information on the crash, for example, to detect that a crash has taken place and/or assist in recovery.

SUMMARY

Disclosed is an apparatus and method for automatic mobile device crash notification in a wireless communication system, for example, in a FLO (Forward Link Only) system or a MediaFLO system. According to one aspect, a method for automatic mobile device crash notification to a wireless network, the method comprising configuring an automatic mobile device crash notification unit by setting configuration parameters, wherein the automatic mobile device crash notification unit includes a mobile device and logic for determining that a crash of the mobile device occurred and for establishing a reverse link data call; using the logic to detect at least one stalled condition to determine if the crash occurred; gathering crash data; and establishing the reverse link data call to transfer the crash data to the wireless network.

According to another aspect, a mobile device for automatically notifying a crash, the mobile device comprising a processor and a memory wherein the memory containing program code executable by the processor for performing the following: setting configuration parameters for automatic notification if the crash occurs; detecting at least one stalled condition to determine if the crash occurred; gathering crash data; establishing a reverse link data call to a wireless network; and transferring the crash data to the wireless network.

According to another aspect, a computer-readable medium including program code stored thereon, comprising program code for setting configuration parameters for automatic notification if a crash of a mobile device occurs; program code for detecting at least one stalled condition to determine if the crash occurred; program code for gathering crash data; program code for establishing a reverse link data call to a wireless network; and program code for transferring the crash data to the wireless network.

Advantages of the present disclosure include automatically detecting a mobile device crash, notifying of the mobile device crash to a wireless network, obtaining information (i.e., crash data) for identifying the cause of the crash, and using the obtained information (i.e., crash data) to aid in recovery of the crashed mobile device with little or no user intervention.

Although the examples disclosed herein are presented in the context of a MediaFLO system, one skilled in the art would understand that the applicability of the examples can extend to other FLO systems and/or other wireless communication systems without affecting the spirit or scope of the present disclosure. It is also understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The wireless multicasting standard MediaFLO (Forward Link Only) employs OFDM to broadcast data to mobile devices with multiple services, including real-time audio and video streams, non-real-time audio and video downloads, and IP datacasts. In one example, MediaFLO employs encrypted quadrature amplitude modulation (QAM) symbols over 4096 subcarriers over the allocated frequency band.

MediaFLO devices are the direct interface to the end users in providing good quality video services in wireless networks. In one instance, a mobile device develops a crash in the mobile device receiver which results in an unrecoverable error. In this case, it is useful to be aware of the conditions under which this crash (a.k.a. fault) occurs. In another example, mobile devices are deployed at remote locations by the wireless network operators to measure performance without human intervention. In this scenario, if a mobile device crashes while in remote operation, human intervention may not be possible, or it may be that the wireless network users or operators are unaware that a mobile device crash has occurred. The capabilities of automatically detecting a mobile device crash, notifying the wireless network of the mobile device crash, obtaining information (i.e., crash data) for identifying the cause of the crash, and using the obtained information (i.e., crash data) to aid in recovery of the crashed mobile device with little or no user intervention facilitates continuing operation.

Figure 1:
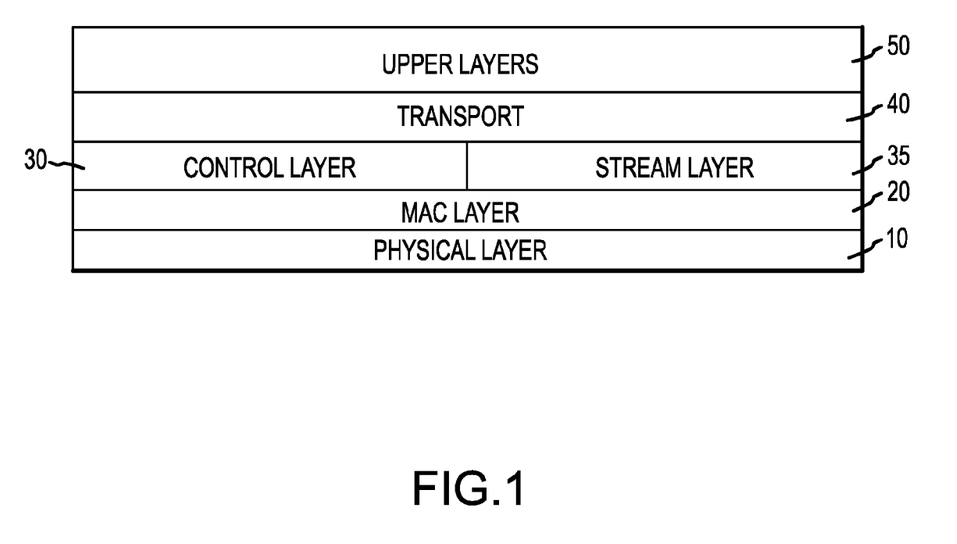
FIG. 1 illustrates an example of a protocol stack model for wireless communication systems, for example, MediaFLO.

FIG. 1 illustrates an example of a protocol stack model for wireless communication systems, for example, MediaFLO. The physical layer 10 provides the channel structure, frequency, power output, modulation and encoding characteristics. In one example, the physical layer 10 uses OFDM as the modulation technique. In addition, it incorporates forward error correction with the concatenation of a parallel concatenated convolutional code (PCCC), i.e. turbo code, and a Reed-Solomon (RS) erasure correcting code.

In one example, transmission and reception are based on using 4096 subcarriers. The modulation symbols are chosen from a quaternary phase shift keying (QPSK) or 16-QAM alphabet. For example, for each OFDM symbol, there are 4000 active subcarriers. These active subcarriers are further equally divided into eight disjoint groups called interlaces. In one aspect, an interlace consists of 500 subcarriers that are evenly spaced across the MediaFLO signal bandwidth. In each OFDM symbol, either interlace 2 or 6 is assigned to the frequency division multiplex (FDM) pilot and is used for channel estimation. Each MediaFLO service is carried over one or more multicast logical channels (MLCs). An MLC contains one or more decodable service subcomponents of independent (user-level) reception interest. MLCs are distinguishable at the physical layer. For example, the video and audio components of a given service can be sent over two different MLCs. A mobile device that is solely interested in the audio component can receive the corresponding MLC without receiving the MLC for the video component, thereby saving on battery resources.

The Medium Access Control (MAC) layer 20 performs multiplexing of information packets belonging to different media streams. The stream layer 35 provides for binding upper layer data flows to MediaFLO streams. The control layer 30, which is at the same level as the stream layer 35 in MediaFLO air interface architecture, is used by the wireless network to disseminate control information to facilitate MediaFLO device operation. In the current MediaFLO standard, the superframe has a duration of exactly 1 second, and consists of 4 frames of equal duration, each roughly 0.25 second. The superframe is known to one skilled in the art and defined in the MediaFLO standard.

The information packets are first Reed Solomon-encoded and then turbo-encoded. During the Reed-Solomon (RS) encoding process, N-K parity packets are generated for every K information packets. The K information packets and the N-K parity packets are used to generate N quantity of RS-encoded packets. RS-encoded packets are also referred to as RS code blocks or outer code blocks.

Additionally, cyclic redundancy check (CRC) bits are generated for each of the N RS-encoded packets. The N RS-encoded packets and the CRC bits are then turbo encoded to generate channel packets which are transmitted. Thus, the minimum number of information packets of a multicast logical channel (MLC) that is transmitted in a superframe is K. MLC transmissions in each superframe are in integer multiples of RS-encoded packets. During transmission, each RS-encoded packet (i.e., RS code block or outer code block) is split into 4 equal sub-blocks, with each sub-block sent in a unique frame within a superframe. The main purpose of utilizing RS-encoding is to exploit the time diversity of the RS-encoded packets within a superframe. The time span of the RS-encoded packet is at least 0.75 seconds. Such a time span supports decorrelation of RS-encoded packets even at low vehicle or walking speeds. One skilled in the art would understand that the numbers given in the various illustrations are examples and are not to be taken to limit the spirit or scope of the present disclosure.

In one example, for a MediaFLO system, the applications at the upper layers 50 deliver information via media transport protocols to the MediaFLO transport layer 40. Within the MediaFLO transport layer 40, the information are concatenated, fragmented and recombined into a sequence of frames. The transport layer 40 delivers a set of fixed-size frames to the stream layer 35. The transport layer 40 also provides an optional encryption/decryption capability and data integrity check.

The stream layer 35 organizes an MLC into three streams. The stream layer does not interpret the information bits contained in the stream. The information bits transmitted in each stream in a superframe constitutes a stream packet. One of the streams, stream 0, is reserved for transporting time-critical control information related to the other two streams, such as conditional access information. The other two streams may be used to transport flows. The transport layer 40 causes each flow to be transported over a stream in an MLC. The mapping of MLCs and streams to flows is signaled in the control layer 30. The transport layer 40 also specifies the general format of messages transported in stream 0.

Figure 2:
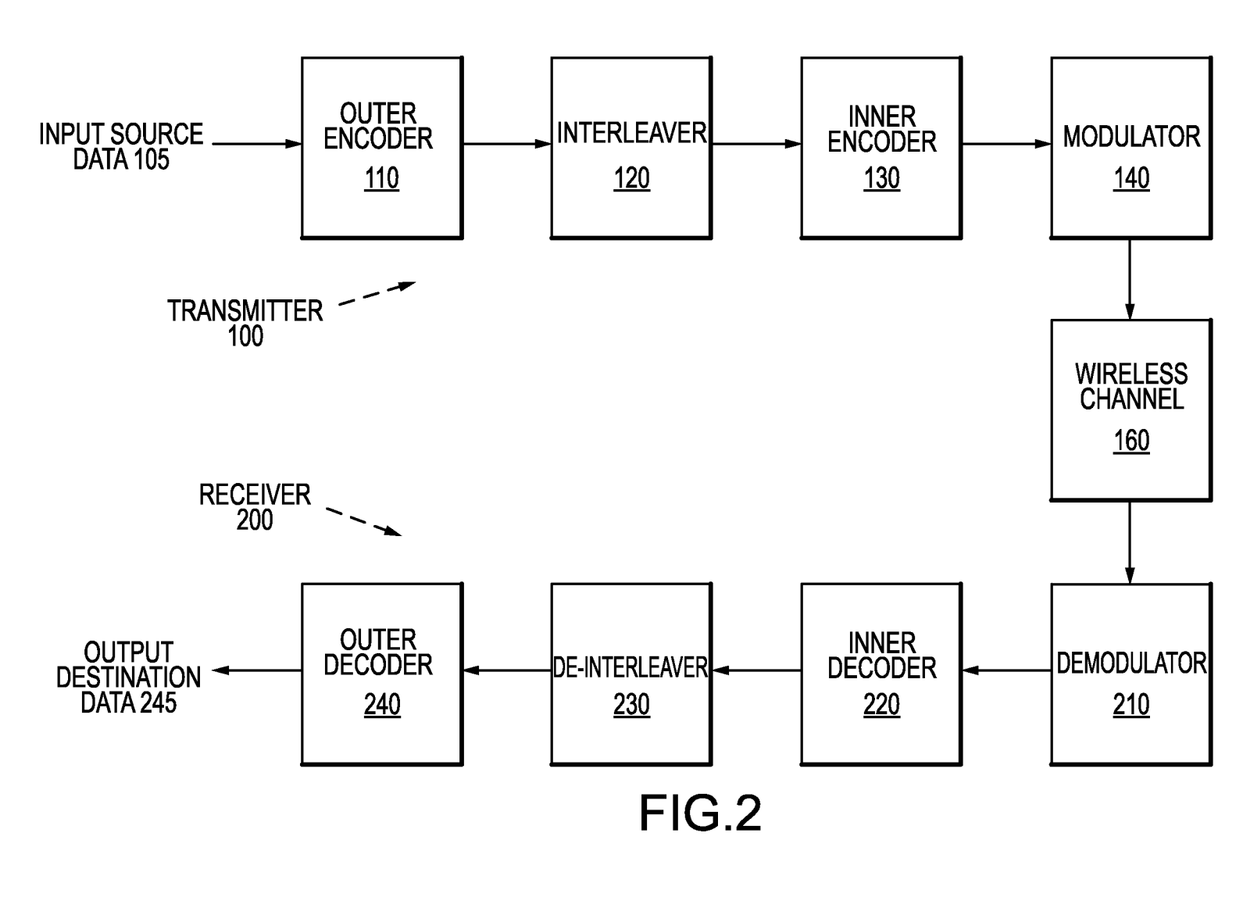
FIG. 2 illustrates an example of a wireless communication system for communication between a wireless network and a mobile device.

FIG. 2 illustrates an example of a wireless communication system for communication between a wireless network and a mobile device (a.k.a., mobile user device, mobile user, user device or user equipment, etc.). In one aspect, the wireless communication system comprises a transmitter 100, a wireless channel 160, and a receiver 200 coupled to an output destination data 245. In one example, the transmitter 100 formats information packets per the protocol stack illustrated in FIG. 1. And, similarly, the receiver 200 receives channel packets per the protocol stack illustrated in FIG. 1. The channel packets are used by the receiver 200 to recover the information packets. Channel packets are information packets that are Reed Solomon-encoded, CRC-encoded and turbo-encoded.

The transmitter 100 receives an input source data 105. A concatenated code consists of two codes: an outer code and an inner code. In one aspect, the transmitter 100 comprises an outer encoder 110, an interleaver 120, an inner encoder 130, and a modulator 140 for processing the input source data 105 to produce a transmitted signal 150 (not shown). The wireless channel 160 propagates the transmitted signal 150 from the transmitter 100 and delivers a received signal 170 (not shown). The received signal 170 is an attenuated, distorted version of transmitted signal 150 along with additive noise. The receiver 200 receives the received signal 170. In one aspect, the receiver 200 comprises a demodulator 210, an inner decoder 220, a deinterleaver 230, and an outer decoder 240 for processing the received signal 170 to produce the output destination data 245. Not shown in FIG. 2 are a high power amplifier and a transmit antenna associated with the transmitter 100. Also not shown are a receive antenna and a low noise amplifier associated with the receiver 200.

Figure 3:
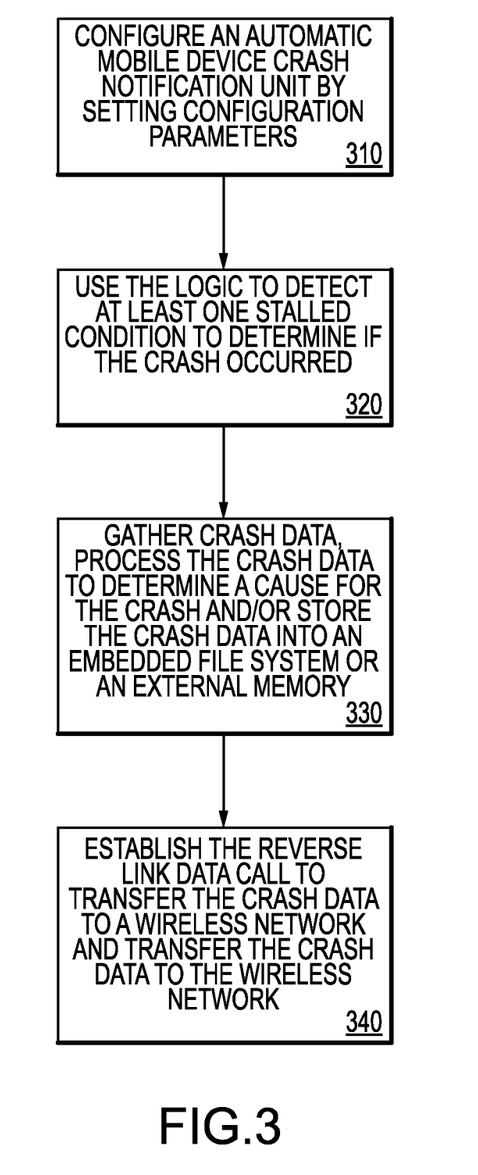
FIG. 3 illustrates an example flow diagram for automatic mobile device crash notification.

FIG. 3 illustrates an example flow diagram for automatic mobile device crash notification. An automatic mobile device crash notification unit is an end to end system, which, in one aspect, includes a mobile device, and logic (e.g., software logic) for determining that a mobile device crash occurred. The logic may also include an auto-call feature of the underlying wireless technology to make a reverse link data call (i.e., logic for establishing a reverse link data call) to a wireless network after determining that the mobile device crash occurred. In one example, the receiver 200 in FIG. 2 includes a processor (not shown) for performing the steps of the example flow diagram illustrated in FIG. 3. In this example, the receiver 200 is the mobile device or is a component of the mobile device.

In FIG. 3, block 310, configure the automatic mobile device crash notification unit by setting configuration parameters. That is, configuration parameters are selected for use relating to a mobile device crash. In one example, the configuration parameters are stored locally in the mobile device. Some examples of the configuration parameters include: duration for active detection, definition of interested events other than mobile device crashes, reverse link data call information such as number to call, maximum size of crash data gathered to be sent back to the wireless network, and/or exclusion criteria for automatic mobile device crash notifications, etc. One skilled in the art would understand that other configuration parameters, based on for example, application, operating conditions, design and user choices, etc., may be used without affecting the spirit or scope of the present disclosure. In one example, the configuration parameters are displayed on a user interface in the event there is user intervention.

Following block 310, in block 320, use the logic to detect at least one stalled condition to determine if the crash of the mobile device (i.e., mobile device crash) occurred. In one example, the determination that the mobile device crash occurred is performed automatically without user intervention. In one aspect, the physical layer software in the mobile device (e.g., a receiver of the mobile device) contains logic to detect at least one stalled condition (e.g., stalled condition of the receiver chip). One skilled in the art would understand that logic can be implemented by hardware, such as but not limited to a processor, and logic can also be implemented by firmware, by software or a combination thereof.

In one example, a check (e.g., monitoring of the counter(s)) is performed in each superframe to detect stalled conditions. The existence of one or more stalled conditions is processed to determine if the mobile device crash has occurred. Counter(s) for various conditions are monitored for information to detect stalled conditions. Use the logic to detect at least one stalled condition to determine if the mobile device crash occurred. Thereafter, the logic (e.g., software logic) resets the counter(s). If, at the end of each superframe there is no information for the actively running counter(s), a logic flag is set to TRUE. In one aspect, if all the logic flags are set to TRUE, the mobile device is stalled, i.e., crashed, such that it is no longer in a usable condition.

In one aspect, at least one counter is maintained to indicate one or more stalled conditions that could lead to a mobile device crash. One counter is known as a Physical Layer Packet (PLP) decode counter. This PLP decode counter is started when the channel packets are decoded. The PLP decode counter is incremented every time a channel packet is decoded at the physical layer or by a mobile device driver software. If the PLP decode counter is zero after a time threshold (e.g., two seconds of decoding), then the mobile device has not decoded any channel packet in the time threshold (e.g., two seconds) and the corresponding logic flag of the PLP decode counter is set to TRUE.

A second counter is known as an Overhead Information Symbols (OIS) decode counter. This OIS decode counter tracks the decoding of overhead information symbols (OIS) in the MediaFLO system. If a mobile device is functionally active, the OIS is decoded for every period known as the Min Monitor time. If a timer with the Min Monitor time expires and if the mobile device still has not started decoding the overhead information symbols (OIS) or if the OIS decode is not successful, then the logic flag of the OIS decode counter is set to TRUE to indicate that the OIS decode aspects of the mobile device are not usable. In one example, an OIS decode is considered unsuccessful if the Received Signal Strength Indication (RSSI) of the channel packets received, which is a measurement of the power level of the channel packets received, is below a predefined RSSI threshold. One skilled in the art would understand that the values of the predefined thresholds discussed herein could depend on the application, operating condition and/or design constraints without affecting the spirit or scope of the present disclosure.

A third counter is known as an interrupt firing counter. The interrupt firing counter tracks the quantity of interrupts that occurs within a time duration, for example, 2 seconds. If there is no interrupt within the time duration, then the logic flag of the interrupt firing counter is set to TRUE.

A fourth counter is known as an event generation counter. Each interrupt is mapped to an event. If the generation of events fails due to no availability of event buffers, this indicates a stall condition which eventually causes the mobile device to crash. By detecting low or no event generation (via the event generation counter) in the early stages, the detection of a mobile device crash is facilitated. When the event generation counter is zero or below a predefined event threshold, the logic flag of the event generation counter is set to TRUE.

A fifth counter is known as a frame end event counter. The frame end event counter indicates how many frame end events have occurred in a given time window, for example, 2 seconds. The frame end event counter should be greater than zero after the given time window. If the frame end event counter is zero after the given time window, this is an indication that the condition may be suitable for a mobile device crash, and the logic flag of the frame end event counter is set to TRUE.

One skilled in the art would understand that the examples of counters disclosed herein are not exclusive and that other counters may be used based on the application, operating conditions, user and design choices without affecting the spirit or scope of the present disclosure. Also, one skilled in the art would understand that the setting of a logic flag (i.e., to either TRUE or FALSE) is an arbitrary choice and not to be taken to limit the spirit or scope of the present disclosure.

Additionally, in one example, other factors are monitored to indicate the occurrence of a mobile device crash. These factors include, but are not limited to, watermark indication, available buffers on the mobile device, memory space used by the flow decode, central processing unit (CPU) cycles, mobile device performance indications, mobile device current consumption indicators, etc. Watermarks are software-generated interrupts such that when a threshold quantity of channel packets are buffered at the hardware, the receiver hardware generates an interrupt to indicate that the software needs to be serviced.

Following block 320, in block 330, gather crash data. In one example, the crash data include information from one or more of the counters and the settings of the logic flags. In another example, the crash data also include channel packets received by the mobile device up to the occurrence of the mobile device crash. In one aspect, the logic of the mobile device processes the gathered crash data to determine the cause of the mobile device crash. The crash data gathered during the mobile device crash is transported through appropriate inter-process communication channels from the logic of the mobile device to the upper layers (FIG. 1). The upper layers of the mobile device receiver communicate with peer processes on the call processing protocol stack of the underlying wireless technology to start the reverse link data call setup. In one aspect, the mobile device stores the crash data to an embedded file or an external memory connected to the mobile device for safe storage, thus allowing for restoration of the crash data after the reverse link data call is established. Information of the storage location of the crash data is transported through the appropriate inter-process communication channels to the upper layers.

Following block 330, in block 340, establish the reverse link data call to transfer the crash data to a wireless network. For example, the crash data is retrieved from the embedded file systems or the external memory for transfer. In one aspect, any previously stored "call setup information" is restored by a call setup logic in the mobile device. The reverse link data call is established, for example, on General Packet Radio System (GPRS), Wideband Code Division Multiple Access (WCDMA), Evolution-Data Optimized (EV-DO), or any other underlying wireless technology. The crash data is restored and transferred to the wireless network.

In one aspect, upon receipt of the crash data by the wireless network, the wireless network uses the crash data to determine the cause of the mobile device crash. In one example, the wireless network stores the crash data in an archive and initiates post processing logic to process the crash data (i.e., de-encrypt and/or decompresse the crash data). For example, the post processing logic (e.g., software logic) of the wireless network checks for defined events that have been logged and tagged by the mobile device (e.g., by the mobile device's driver software). Once the post processing logic of the wireless network locates the sequence of events that led up to the mobile device crash, the wireless network exports a crash log of the events into user readable format and sends the crash log to pre-defined recipients and/or broadcasts the crash log.

One skilled in the art would understand that the steps disclosed in FIG. 3 can be interchanged in their order without departing from the scope and spirit of the present disclosure. Also, one skilled in the art would understand that the steps illustrated in the example flow diagram of FIG. 3 are not exclusive and other steps may be included or one or more of the steps may be deleted without affecting the scope and spirit of the present disclosure.

Those of skill would further appreciate that the various illustrative components, logical blocks, modules, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 4:
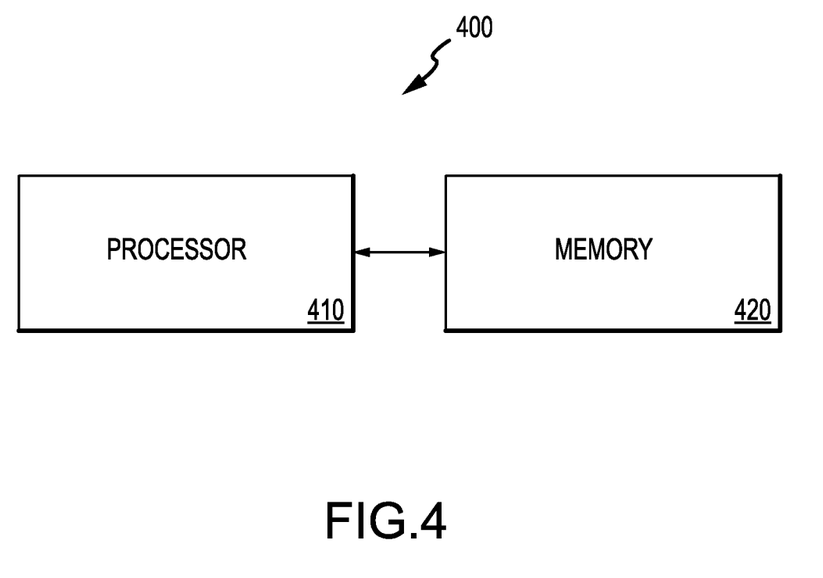
FIG. 4 illustrates an example of a device comprising a processor in communication with a memory for executing the processes for automatic mobile device crash notification.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 4 illustrates an example of a device 400 comprising a processor 410 in communication with a memory 420 for executing the processes for automatic mobile device crash notification. In one example, the device 400 is used to implement the algorithm illustrated in FIG. 3. In one aspect, the memory 420 is located within the processor 410. In another aspect, the memory 420 is external to the processor 410. In one aspect, the processor includes circuitry for implementing or performing the various flow diagrams, logical blocks and/or modules described herein.

Figure 5:
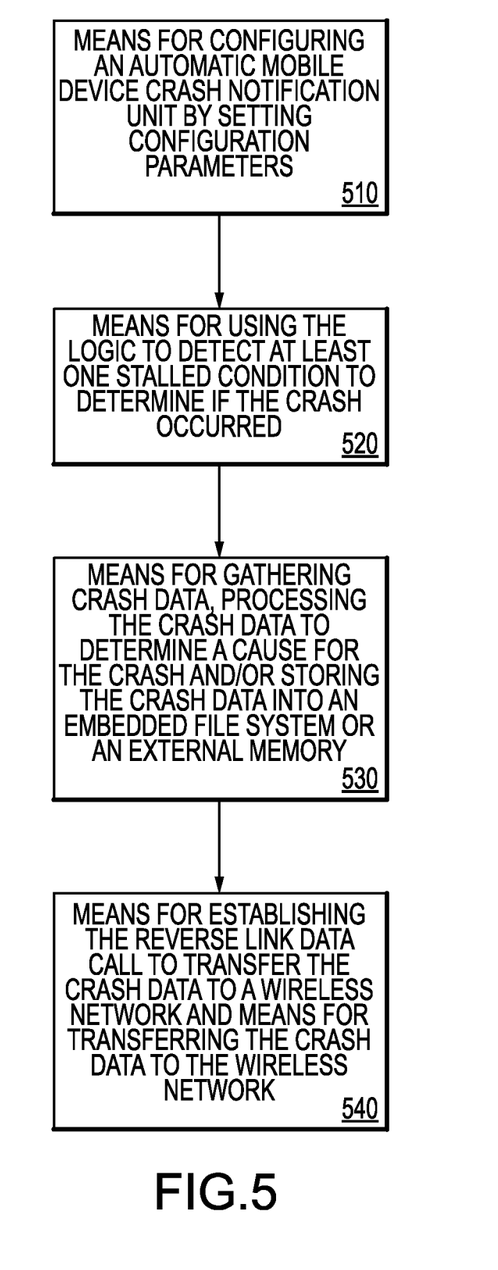
FIG. 5 illustrates an example of a device suitable for executing an automatic mobile device crash notification.

FIG. 5 illustrates an example of a device 500 suitable for executing an automatic mobile device crash notification. In one aspect, the device 500 is implemented by at least one processor comprising one or more modules configured to provide different aspects of automatic mobile device crash notification as described herein in blocks 510, 520, 530 and 540. For example, each module comprises hardware, firmware, software, or any combination thereof. In one aspect, the device 500 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for automatic mobile device crash notification to a wireless network, the method comprising:
setting configuration parameters for automatic mobile device crash notification if a crash of the mobile device occurs;
detecting at least one stalled condition to determine if the crash occurred by monitoring at least one counter of a plurality of counters and determining if information related to the at least one counter is absent from a superframe, including:
setting a logic flag value associated with the at least one counter to indicate a stalled condition of a function associated with the at least one counter if the information related to the at least one counter is absent from the superframe; and
determining that the crash occurred when the logic flag value associated with the at least one counter indicates the stalled condition of the function associated with the at least one counter;
gathering crash data when it is determined that the crash occurred;
establishing a reverse link data call when it is determined that the crash occurred; and
using the reverse link data call to transfer the crash data to the wireless network.

2. The method of claim 1 wherein the configuration parameters include one or more of: duration for active detection, definition of interested events other than mobile device crashes, reverse link data call information such as number to call, maximum size of crash data gathered to be sent back to the wireless network, or exclusion criteria for automatic mobile device crash notifications.

3. The method of claim 1 wherein the step of using the logic to detect at least one stalled condition includes monitoring one or more of the following counters: a Physical Layer Packet (PLP) decode counter, an Overhead Information Symbols (OIS) decode counter, an interrupt firing counter, an event generation counter or a frame end event counter.

4. The method of claim 3 wherein the monitoring is performed in each superframe to detect the at least one stalled condition.

5. The method of claim 3 wherein the crash data include information from one or more of the counters and one or more logic flags associated with the counters.

6. The method of claim 5 wherein the crash data further include channel packets received by the mobile device prior to the crash.

7. The method of claim 3, wherein the PLP decode counter is incremented every time a channel packet is decoded, and if the PLP decode counter is zero after a time threshold, a logic flag value associated with the PLP decode counter is set to indicate the stalled condition.

8. The method of claim 1 further comprising processing the crash data to determine a cause for the crash.

9. The method of claim 8 further comprising storing the crash data to an embedded file or an external memory connected to the mobile device.

10. The method of claim 1 wherein the reverse link data call is established on one of the following wireless technologies: General Packet Radio System (GPRS), Wideband Code Division Multiple Access (WCDMA) or Evolution-Data Optimized (EV-DO).

11. The method of claim 10, wherein the crash data is used to determine a cause of the crash.

12. The method of claim 1, further comprising determining that the crash occurred when a plurality of logic flag values associated with a plurality of counters are set to indicate the stalled condition.

13. A mobile device for automatically notifying a crash, the mobile device comprising a processor and a memory wherein the memory containing program code executable by the processor for performing the following:
setting configuration parameters for automatic notification if the crash occurs;
detecting at least one stalled condition to determine if the crash occurred by monitoring at least one counter of a plurality of counters and determining if information related to the at least one counter is absent from a superframe, including:
setting a logic flag value associated with the at least one counter to indicate a stalled condition of a function associated with the at least one counter if the information related to the at least one counter is absent from the superframe; and
determining that the crash occurred when the logic flag value associated with the at least one counter indicates the stalled condition of the function associated with the at least one counter;
gathering crash data when it is determined that the crash occurred;
establishing a reverse link data call to a wireless network when it is determined that the crash occurred; and using the reverse link data call for transferring the crash data to the wireless network.

14. The mobile device of claim 13 wherein the reverse link data call is established on one of the following wireless technologies: General Packet Radio System (GPRS), Wideband Code Division Multiple Access (WCDMA) or Evolution-Data Optimized (EV-DO).

15. The mobile device of claim 13 wherein the configuration parameters include one or more of: duration for active detection, definition of interested events other than mobile device crashes, reverse link data call information such as number to call, maximum size of crash data gathered to be sent back to the wireless network, or exclusion criteria for automatic mobile device crash notifications.

16. The mobile device of claim 13 wherein the memory further comprises program code for monitoring one or more of the following counters: a Physical Layer Packet (PLP) decode counter, an Overhead Information Symbols (OIS) decode counter, an interrupt firing counter, an event generation counter or a frame end event counter.

17. The mobile device of claim 16 wherein the crash data include information from one or more of the counters and one or more logic flags associated with the counters.

18. The mobile device of claim 17 wherein the memory further comprises program code for storing the crash data to an embedded file or an external memory connected to the mobile device.

19. The mobile device of claim 18 wherein the memory further comprises program code for processing the crash data to determine a cause for the crash.

20. A non-transitory computer-readable medium including program code stored thereon, comprising:
    program code for setting configuration parameters for automatic notification if a crash of a mobile device occurs;
    program code for detecting at least one stalled condition to determine if the crash occurred by monitoring at least one counter of a plurality of counters and determining if information related to the at least one counter is absent from a superframe, including:
        program code for setting a logic flag value associated with the at least one counter to indicate a stalled condition of a function associated with the at least one counter if the information related to the at least one counter is absent from the superframe;
        program code for determining that the crash occurred when the logic flag value associated with the at least one counter indicates the stalled condition of the function associated with the at least one counter;
    program code for gathering crash data when it is determined that the crash occurred;
    program code for establishing a reverse link data call to a wireless network when it is determined that the crash occurred; and
    program code for using the reverse link data call for transferring the crash data to the wireless network.

21. The computer-readable medium of claim 20 further comprising program code for processing the crash data to determine a cause for the crash.

22. The computer-readable medium of claim 21 further comprising program code for storing the crash data to an embedded file or an external memory connected to the mobile device.

23. An apparatus for automatic mobile device crash notification to a wireless network, comprising:
    means for setting configuration parameters for automatic notification if a crash of a mobile device occurs;
    means for detecting at least one stalled condition to determine if the crash occurred by monitoring at least one counter of a plurality of counters and determining if information related to the at least one counter is absent from a superframe, including:
        means for setting a logic flag value associated with the at least one counter to indicate a stalled condition of a function associated with the at least one counter if the information related to the at least one counter is absent from the superframe;
        means for determining that the crash occurred when the logic flag value associated with the at least one counter indicates the stalled condition of the function associated with the at least one counter;
    means for gathering crash data when it is determined that the crash occurred;
    means for establishing a reverse link data call to a wireless network when it is determined that the crash occurred; and
    means for using the reverse link data call for transferring the crash data to the wireless network.

* * * * *